US011416560B2

(12) United States Patent
Kosaka et al.

(10) Patent No.: US 11,416,560 B2
(45) Date of Patent: Aug. 16, 2022

(54) RETRIEVAL DEVICE, RETRIEVAL METHOD, AND RETRIEVAL PROGRAM

(71) Applicant: NIPPON TELEGRAPH AND TELEPHONE CORPORATION, Tokyo (JP)

(72) Inventors: Naoko Kosaka, Musashino (JP); Tomohiro Kokogawa, Musashino (JP); Megumi Uesu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/734,991

(22) PCT Filed: May 31, 2019

(86) PCT No.: PCT/JP2019/021848
§ 371 (c)(1),
(2) Date: Dec. 3, 2020

(87) PCT Pub. No.: WO2019/235394
PCT Pub. Date: Dec. 12, 2019

(65) Prior Publication Data
US 2021/0232629 A1 Jul. 29, 2021

(30) Foreign Application Priority Data
Jun. 5, 2018 (JP) .............................. JP2018-108157

(51) Int. Cl.
*G06F 16/906* (2019.01)
*G06F 16/9035* (2019.01)
*G06F 16/17* (2019.01)

(52) U.S. Cl.
CPC ........ *G06F 16/906* (2019.01); *G06F 16/1734* (2019.01); *G06F 16/9035* (2019.01)

(58) Field of Classification Search
CPC . G06F 16/906; G06F 16/9035; G06F 16/1734
(Continued)

(56) References Cited

U.S. PATENT DOCUMENTS

| | | | | |
|---|---|---|---|---|
| 7,966,644 B2* | 6/2011 | Noda | ................... | H04L 9/3236 726/1 |
| 2010/0070615 A1* | 3/2010 | Alexander | ............. | G16H 40/20 709/219 |
| 2013/0066869 A1* | 3/2013 | Kusaka | ............... | G06F 11/0715 707/737 |

OTHER PUBLICATIONS

Lemoudden, Mouad, et al., "Managing cloud-generated logs using big data technologies", WINCOM 2015, Marrakech, Morocco, Oct. 20-23, 2015, 7 pages.*

(Continued)

*Primary Examiner* — Robert Stevens
(74) *Attorney, Agent, or Firm* — Xsensus LLP

(57) ABSTRACT

A search device has a know-how storing unit for storing a log indicating a past crisis response instance, one of a "problem" label indicating that the log is of a problem instance that is to be responded and solved, a "result" label indicating that the log is of a result brought about by a responding action, and a "response" label indicating that the log is of a responding action that has been performed to solve a problem, and a task number corresponding to the log, in association with each other. Further, there is a know-how search unit for repeating a search to retrieve a log similar to a first search key that is an input log from logs assigned the "problem" label in the know-how storing unit, and a search to retrieve a log similar to a second search key.

5 Claims, 13 Drawing Sheets

(58) Field of Classification Search
USPC .......................................................... 707/722
See application file for complete search history.

(56) References Cited

OTHER PUBLICATIONS

Xu, Wei, et al., "Detecting Large-Scale System Problems by Mining Console Logs", SOSP '09, Big Sky, MT, Oct. 11-14, 2009, pp. 117-131.*

Kosaka et al., "Disaster Information System Using Natural Language Processing", Journal of Disaster Research, vol. 12, No. 1, 2017, pp. 67-78.

Kosaka et al., "Generation of Schematized Incident Response Story as Know-How for Commander", Knowledge, Information, and Creativity Support Systems, Nov. 2017, pp. 84-89.

* cited by examiner

Fig. 2

| ID | PRIORITY | STATUS | SCHEDULED COMPLETION | TASK NAME | RELATED TASK | DATE AND TIME OF ISSUANCE | TRANSMISSION SOURCE | TRANSMISSION DESTINATION | COMMUNICATION CONTENT |
|---|---|---|---|---|---|---|---|---|---|
| 1 | NORMAL | COMPLETE | | COMPLAINT REGARDING TRANSPORTATION FROM A CITIZEN (ACCEPTED BY PERSON A) | | 2017/02/21 15:03 | MOC-N TT | TOURNAMENT OPERATION HEAD OFFICE COMPETITION VENUE | THERE WAS A TROUBLE THAT A FOREIGNER WHO BOARDED A BUS DEPARTING FROM SHIRAHATA-YAMA BOARDED A BUS GOING TO A WRONG DESTINATION. THE STAFF ONLY PROVIDES GUIDANCE IN JAPANESE TO PASSENGERS AFTER BOARDING THE BUS. THE PROBLEM WOULD NOT OCCUR IF AT LEAST GUIDANCE ON THE DESTINATION IS GIVEN IN ENGLISH. IMPROVEMENT IS DESIRED. (ACCEPTED BY STAFF A) |
| ... | ... | ... | ... | ... | ... | ... | ... | ... | ... |

| TASK ID | LABEL | SENTENCE |
|---|---|---|
| 1 | PROBLEM | COMPLAINT REGARDING TRANSPORTATION FROM A CITIZEN. (ACCEPTED BY PERSON A) |
| 1 | PROBLEM | THERE WAS A TROUBLE THAT A FOREIGNER WHO BOARDED A BUS DEPARTING FROM SHIRAHATA-YAMA BOARDED A BUS GOING TO A WRONG DESTINATION. |
| 1 | PROBLEM | THE STAFF ONLY PROVIDES GUIDANCE IN JAPANESE TO PASSENGERS AFTER BOARDING THE BUS. |
| 1 | RESPONSE | THE PROBLEM WOULD NOT OCCUR IF AT LEAST GUIDANCE ON THE DESTINATION IS GIVEN IN ENGLISH. IMPROVEMENT IS DESIRED. (ACCEPTED BY STAFF A) |
| ⋮ | ⋮ | ⋮ |

| ★ | ID | PRIORITY | STATUS | SCHEDULED COMPLETION | TASK NAME | RELATED TASK | DATE AND TIME OF ISSUANCE | TRANSMISSION SOURCE | TRANSMISSION DESTINATION | COMMUNICATION CONTENT | M1 ATTACHMENT | CB OPERATION |
|---|---|---|---|---|---|---|---|---|---|---|---|---|
| ★ | 1 | NORMAL | COMPLETE | | COMPLAINT REGARDING TRANSPORTATION FROM A CITIZEN (ACCEPTED BY PERSON A) | | 2017/02/21 15:03 | MOC-NTT | TOURNAMENT OPERATION; HEAD OFFICE; COMPETITION VENUE | THERE WAS A TROUBLE THAT A FOREIGNER WHO BOARDED A BUS DEPARTING FROM SHIRAHATA-YAMA BOARDED A BUS GOING TO A WRONG DESTINATION. THE STAFF ONLY PROVIDES GUIDANCE IN JAPANESE TO PASSENGERS AFTER BOARDING THE BUS. THE PROBLEM WOULD NOT OCCUR IF AT LEAST GUIDANCE ON THE DESTINATION IS GIVEN IN ENGLISH. IMPROVEMENT IS DESIRED. (ACCEPTED BY STAFF A) | | ▶ REGISTER KNOWN-HOW B1 |

Fig. 7

[EXAMPLE CLASSIFICATION]

"[PROBLEM] COMPLAINT REGARDING TRANSPORTATION FROM A CITIZEN. (ACCEPTED BY PERSON A)"

[PROBLEM] THERE WAS A TROUBLE THAT A FOREIGNER WHO BOARDED A BUS DEPARTING FROM SHIRAHATA-YAMA BOARDED A BUS GOING TO A WRONG DESTINATION.
[PROBLEM] THE STAFF ONLY PROVIDES GUIDANCE IN JAPANESE TO PASSENGERS AFTER BOARDING THE BUS.
[RESPONSE] THE PROBLEM WOULD NOT OCCUR IF AT LEAST GUIDANCE ON THE DESTINATION IS GIVEN IN ENGLISH. IMPROVEMENT IS DESIRED. (ACCEPTED BY STAFF A)

RETRIEVAL DEVICE, RETRIEVAL METHOD, AND RETRIEVAL PROGRAM

CROSS-REFERENCE TO RELATED APPLICATIONS

The present application is based on PCT filing PCT/JP2019/021848, filed May 31, 2019, which claims priority to JP 2018-108157, filed Jun. 5, 2018, the entire contents of each are incorporated herein by reference.

TECHNICAL FIELD

The present invention relates to a search device, a search method, and a search program.

BACKGROUND ART

In case of a crisis event, such as a large-scale natural disaster or a cyber-attack, a crisis response that reduces risk is required to be made so as to prevent the same problem from occurring, by utilizing knowledge from the past. In this regard, in a crisis response, it may be difficult for an inexperienced person in charge to look ahead and take countermeasures that reduce risk with a large impact. For this reason, the person in charge asks an experienced person about how he responded to similar events in the past, and refers to documents such as a disaster response report.

Conventionally, there is a technology for storing past response logs and searching for a similar past response log (past log) when a log that is currently being handled is input, thereby referencing the past log for the response (see Patent Literatures 1 and 2). In this technology, there are two types of text search: in one type of text search, an entire input response log is used as a search condition; and in the other type of text search, a user inputs, adds, and edits a search condition that he wants to search for, in the form of text or a keyword.

CITATION LIST

Non Patent Literature

[NPL 1] Naoko Kosaka et al., "Disaster Information System Using Natural Language Processing", JDR, Vol. 12, No. 1, pp. 67-78, 2017.
[NPL 2] Naoko Kosaka et al., "Generation of Schematized Incident Response Story as Know-How for Commander", KICSS2017, November 2017.

SUMMARY OF THE INVENTION

Technical Problem

To reference knowledge (e.g. know-how) from the past, the user needs to search for past instances with more similar risk. However, if the user who wants to reference past instances is an inexperienced person in charge, he may not be able to assume the risk sufficiently.

In other words, it is unlikely that a user who wants to know a possible risk in the future will be able to accurately specify the risk and input a search condition. Moreover, simply presenting the full text of a past response instance does not raise the level of experience of the person in charge, and the past instance needs to be structured in order to use this past instance as know-how.

The present invention was made in view of the above, and an object of the invention is to provide a search device, a search method, and a search program that make it possible, in order to respond to a crisis, to appropriately retrieve a similar instance from past crisis response instances, regardless of a user's experience.

Means for Solving the Problem

To solve the foregoing problem and achieve the object, a search device according to the present invention includes: a storing unit for storing a log indicating a past crisis response instance, one of a problem label indicating that the log is of a problem instance that is to be responded and solved, a result label indicating that the log is of a result brought about by a responding action, and a response label indicating that the log is of a responding action that has been performed to solve a problem, and a task number corresponding to the log, in association with each other; and a search unit for repeating a search to retrieve a log similar to a first search key that is an input log from logs assigned the problem label stored in the storing unit, and a search to retrieve a log similar to a second search key that is a log assigned the result label with the same task number as the retrieved log assigned the problem label, until a predetermined condition is met.

Effects of the Invention

According to the present invention, to respond to a crisis, a similar instance can be appropriately retrieved from past crisis response instances, regardless of a user's experience.

BRIEF DESCRIPTION OF DRAWINGS

FIG. 2 is a diagram showing an example of a data configuration of a crisis response log table.
FIG. 3 is a diagram showing an example of a data configuration of a how-how table.
FIG. 6 is a diagram showing an example of a screen of a client terminal.
FIG. 7 is a diagram illustrating example classification performed by a know-how classification unit shown in FIG. 1.

DESCRIPTION OF EMBODIMENTS

Hereinafter, an embodiment of a search device, a search method, and a search program according to the present application will be described in detail with reference to the figures. Note that the present invention is not limited by the present embodiment. An example will be described in which the search device of the present invention is realized as a device included in a crisis management system, or a function of a crisis management system.

Embodiment

Summary of Crisis Management System

Here, a crisis management system refers to a system that assists in management of a crisis management office of a municipality or a company to respond to a crisis, such as a disaster or a cyber-attack. A board is defined as a bundle of various crisis management response tasks for certain crisis management. Various kinds of information that is required to carry out crisis management is compiled in the board. The crisis management system assists a user to make a decision, and also assists in inter-organizational collaboration, by outputting such information to the user.

In addition, the search device according to the present embodiment holds logs that describe past crisis response instances as crisis response logs. Here, a crisis response log is of an individual crisis response instance. Although there is a series of events (responses to problems and results thereof), the crisis response log only contains facts in the past. Accordingly, the crisis response log does not include anything like a causal relationship regarding what is assumed based on a combination of these events.

The search device according to the present embodiment retrieves related portions from the aforementioned crisis response logs by structuring the logs (extracting important text), artificially connects past response instances, and presents a possible causal relationship with respect to the current situation to the user. At this time, the search device according to the present embodiment displays similar portions between a log input by the user and a retrieved crisis response log while associating the similar portions with each other by highlighting or the like.

Thus, in the present embodiment, to respond to a crisis, a similar instance is appropriately retrieved from the past crisis response instances and is presented to the use while associating similar portions with each other, regardless of the user's experience. The user can thus specify the risk corresponding to the situation, and appropriately check know-how for this risk.

Configuration of Crisis Management System

Figure 1:
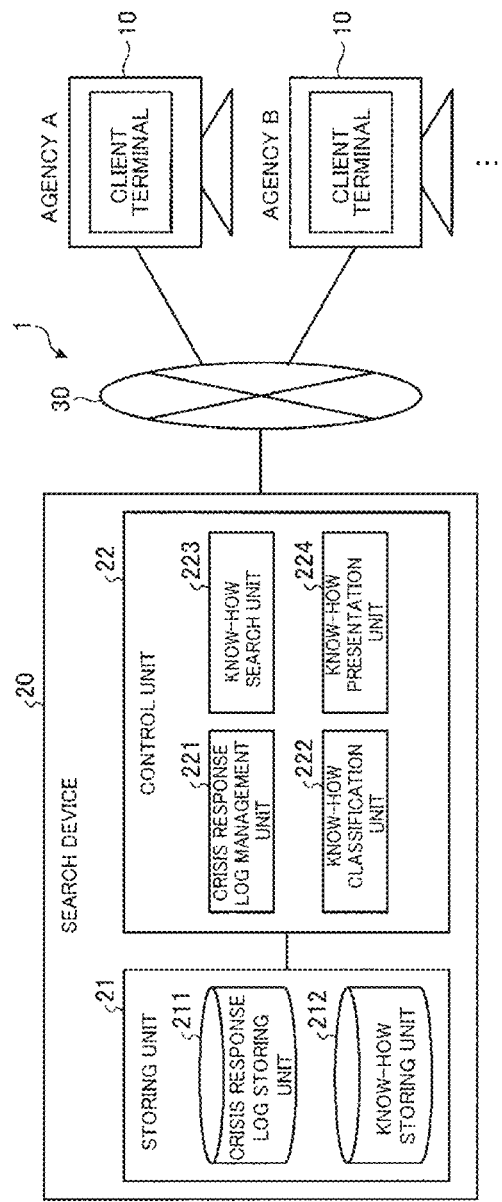
FIG. 1 is a diagram for illustrating a configuration of a crisis management system.

FIG. 1 is a diagram for illustrating a configuration of the crisis management system. As shown in FIG. 1, the crisis management system 1 has a configuration in which a plurality of client terminals 10 and a search device 20 are connected via a network 30. Note that the search device 20 may be provided at the same location as a headquarter of a general management organization that oversees and manages the crisis, or may be provided at a location different from the general management organization. The client terminals 10 are provided in the general management organization and agencies associated with the general management organization.

The search device 20 is, for example, a server device. The search device 20 also has a function of managing crisis response information that indicates the state of response to the crisis by the organization. The search device 20 provides crisis response information to users of the client terminals 10 by displaying various screens that show the crisis response information on the client terminals 10 provided in subordinate organizations, branches, or the like of a task force.

The search device 20 holds logs that describe past crisis response instances, in association with corresponding task identification information. In addition, the search device 20 classifies the logs into important sentence labels and holds the logs as know-how. The search device 20 retrieves, from the logs held as know-how, a log similar to an input log, and a log similar to a log with a predetermined label, out of logs with the same task number as the retrieved log. Then, the search device 20 presents similar portions between the input log and the retrieved logs in association with each other, to a client terminal 10 from which the input log was input.

Each of the client terminals 10 may be, for example, a personal computer, a smart phone, a mobile phone, or the like. The user can reference and write to the board via a web browser of the client terminal 10. Upon a user inputting a crisis response log via a web browser of the client terminal 10, logs similar to the input log are artificially connected to each other and displayed on the screen of the client terminal 10. By checking the displayed results, the user can recognize a possible causal relationship with respect to the current situation, and can quickly understand how to deal with the risk in comparison with the current situation.

The network 30 need only be configured such that the connected devices can communicate with each other. For example, the network 30 may be the Internet, a LAN (Local Area Network), a WAN (Wide Area Network), or the like.

Configuration of Management Device

Next, a configuration of the search device 20 will be described in detail. This search device 20 has a storing unit 21 and a control unit 22, as shown in FIG. 1.

The storing unit 21 is realized by a semiconductor memory element, such as a RAM (Random Access Memory) or a flash memory, or a storage device such as a hard disk or an optical disk, and stores a processing program for operating the search device 20, data that is to be used when the processing program is executed, and so on. The storing unit 21 includes a crisis response log storing unit 211 and a know-how storing unit 212.

The crisis response log storing unit 211 stores logs that describe past crisis response instances as crisis response logs. The crisis response log storing unit 211 stores a crisis response log table, in which device response logs are associated with task IDs.

FIG. 2 is a diagram showing an example of a data configuration of the crisis response log table. As shown in a table T1 in FIG. 2, various kinds of information corresponding to task ID, priority, task status, task name, related task, date and time of issuance, transmission source, transmission destination, and communication content are registered in the crisis response log table. For example, in a log corresponding to the task name: "Complaint regarding transportation from a citizen" with the task ID "1", the following three sentences indicating the communication content are associated with each other: "There was a trouble that a foreigner who boarded a bus departing from Shirahata-yama boarded a bus going to a wrong destination."; "The staff only provides guidance in Japanese to passengers after boarding the bus."; and "The problem would not occur if at least guidance on the destination is given in English. Improvement is desired. (accepted by staff A)".

The know-how storing unit 212 stores a know-how table, in which crisis response logs, task IDs, and labels are associated with each other. The know-how storing unit 212 stores the crisis response logs after labeling each sentence. The crisis response logs stored in the know-how storing unit 212 are logs that an instruction to register as know-how has been given.

The labels assigned to the logs include "problem", "result", "response", and "other". The "problem" label indicates that the log is of a problem instance that is to be responded and solved. The "result" label indicates that the log is of the result of a responding action. The "other" label indicates that the log is of an other instance that is not a problem instance, a result, or a responding action. The "response" label indicates that the log is of a responding action that was performed to solve the problem.

FIG. 3 is a diagram showing an example of a data configuration of a how-how table. As shown in a table T2 in FIG. 3, task IDs, labels, and sentences that constitute crisis response logs are registered in the know-how table. For example, as shown in the second row in the table T2, the "problem" label is assigned to "There was a trouble that a foreigner who boarded a bus departing from Shirahata-yama boarded a bus going to a wrong destination." with the task ID "1". Also, as shown in the fourth row in the table T2, the "response" label is assigned to "The problem would not occur if at least guidance on the destination is given in English. Improvement is desired. (accepted by staff A)" with the task ID "1".

Next, the control unit 22 will be described. The control unit 22 has an internal memory for storing programs that define various processing procedures and the like, and required data, and executes various kinds of processing using these programs and data. For example, the control unit 22 is an electronic circuit such as a CPU (Central Processing Unit) or an MPU (Micro Processing Unit). The control unit 22 has a crisis response log management unit 221, a know-how classification unit 222 (classification unit), a know-how search unit 223 (search unit), and a know-how presentation unit 224 (presentation unit).

The crisis response log management unit 221 collects logs related to crisis response and stores the collected logs in the crisis response log storing unit 211. For example, the crisis response log management unit 221 collects logs related to crisis responses via an input screen displayed on the web browser of the client terminal 10 by the user.

If an instruction to classify a log is received, the know-how classification unit 222 classifies the log as one of a problem instance, a result, a responding action, or the other instance that is not a problem instance, a result, or a responding action. The know-how classification unit 222 assigns a label corresponding to the classification result to the log, and stores the log in association with the task ID in the know-how storing unit 212. The know-how classification unit 222 classifies the input log sentence-by-sentence. The know-how classification unit 222 classifies the log using a feature space, which is constructed, in advance, by supervised classification through natural language processing.

The know-how search unit 223 searches for a log that is similar to the input log. Specifically, the know-how search unit 223 repeats a search to retrieve a log similar to a first search key that is an input log from logs assigned the "problem" label or the "other" label stored in the know-how storing unit 212, and a search to retrieve a log similar to a second search key that is a log assigned the "result" label with the same task number as the retrieved log assigned the "problem" label, until a predetermined condition is met. The know-how search unit 223 performs the search if the "response" label or the "other" label is assigned to the input log by the know-how classification unit 222. The know-how search unit 223 performs the search, sentence-by-sentence, with respect to a log.

The know-how presentation unit 224 presents similar portions between the input log and the logs retrieved by the know-how search unit 223 in association with each other, to the client terminal 10 from which the input log was input.

Labels

Figure 4:
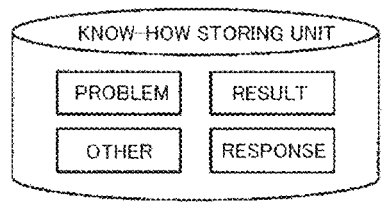
FIG. 4 is a diagram illustrating labels.
Figure 5:
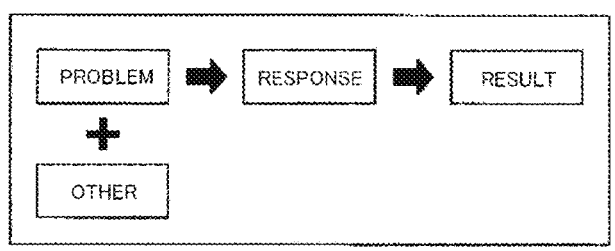
FIG. 5 is a diagram showing the relationship between the labels.

Next, the labels will be described. FIG. 4 is a diagram illustrating the labels. FIG. 5 is a diagram showing the relationship between the labels. As shown in FIGS. 4 and 5, in the present embodiment, the labels are roughly divided into situation labels and response labels. There are three types of situation labels: namely, "problem", "other", and "response". There is one type of response label, which is "response".

The "problem" label indicates that the log is of a problem instance that is to be responded and solved. The "result" label indicates that the log is of the result of a responding action. An example of the result is the state of internal assets or the like that was brought about as a result of the responding action. The "other" label indicates that the log is of the content other than a problem, a result, or a response. The "other" label is assigned to a log that describes a goal for solving the problem, or an event that may be a risk when the "response" is made, for example. Events that may be a risk include an event that may become an obstacle, an event that may occur as a result of the "response" being made, or the like. The "other" label is also assigned to a log that does not describe an event that may be a risk but describes something about an external environment or an internal environment, and a log that describes the weather, time zone, area, assets, or the state of resources.

The "response" label indicates that the log is of the content of a responding action that was performed to solve the problem. The "response" label is assigned to a log that describes an action to be performed to solve the "problem".

Next, the relationship between the labels will be described with reference to FIG. 5. As shown in FIG. 5, for an instance of a log with the "problem" label, a response to solve the problem (a responding action described in a log with the "response" label) was carried out, and the state that was brought about as a result of the responding action is described in a log with the "result" label. For the "problem," there are "other" situations that may accompany the problem and "other" situations as environmental conditions when the problem is not clear.

Crisis Response Log Management Unit

Next, processing performed by the crisis response log management unit 221 will be described. For example, the crisis response log management unit 221 collects logs related to a crisis response via an input screen displayed on the web browser of the client terminal 10 by the user. FIG. 6 shows an example of an input screen displayed on the web browser of the client terminal 10 shown in FIG. 1.

An input screen M1 in FIG. 6 contains the following items: ID (task ID), priority, status, scheduled completion, task name, related tasks, date and time of issuance, transmission source, contact destination, communication content, attachment, and operation. In the operation item, as shown in a check box CB in FIG. 6, selection boxes are shown that make it possible to give an instruction to perform various kinds of processing for the log. For example, the case where the user selects a "register know-how" box B1 in the check box CB will be described.

In this case, the crisis response log management unit 221 accepts an instruction to register the following three sentences, which are the communication content with the task ID "1": "There was a trouble that a foreigner who boarded a bus departing from Shirahata-yama boarded a bus going to a wrong destination."; "The staff only provides guidance in Japanese to passengers after boarding the bus."; and "The problem would not occur if at least guidance on the destination is given in English. Improvement is desired. (accepted by staff A)". The crisis response log management unit 221 then stores the three accepted sentences in the crisis response log storing unit 211, and requests the know-how classification unit 222 to classify these sentences. The know-how classification unit 222 classifies each of the three accepted sentences, and stores these sentences, with respective labels assigned thereto, in association with the task ID in the know-how storing unit 212.

Thus, if the user has exchanged messages under a task, the messages are managed in the form of a thread in association with the task, and are stored in the crisis response log storing unit 211 by the crisis response log management unit 221. Furthermore, if an instruction to register the know-how is given, the communication content for which the registration instruction is given is labeled by the know-how classification unit 222, and is then stored in the know-how storing unit 212. Also, if a crisis response log is input, the search device 20 classifies the input log, and then retrieves logs similar to the input log and presents the search results to the client terminal 10.

Know-how Classification Unit

Next, processing performed by the know-how classification unit 222 will be described. FIG. 7 is a diagram illustrating an example classification performed by the know-how classification unit 222 shown in FIG. 1.

The know-how classification unit 222 classifies a log using a feature space, which is constructed, in advance, by supervised classification through natural language processing. The feature space for classifying important sentence labels is constructed in advance by supervised classification through natural language processing. The feature space is regularly reconstructed. Alternatively, the feature space may be irregularly reconstructed, either on the occasion of designation by the user, or on the occasion that the increment of data volume exceeds a threshold. The important sentence labels in this case are implemented while automatically incorporating correction information collected by the know-how presentation unit.

For example, as shown in FIG. 7, the know-how classification unit 222 classifies "Complaint regarding transportation from a citizen. (accepted by Person A)" is classified as a problem instance and assigns the "problem" label thereto, using the feature space. The know-how classification unit 222 classifies each of the two sentences: "There was a trouble that a foreigner who boarded a bus departing from Shirahata-yama boarded a bus going to a wrong destination." and "The staff only provides guidance in Japanese to passengers after boarding the bus." as a problem instance, and assigns the "problem" label thereto, using the feature space. Also, the know-how classification unit 222 classifies the sentence: "The problem would not occur if at least guidance on the destination is given in English. Improvement is desired. (accepted by staff A)" as a responding action, and assigns the "response" label to this sentence, using the feature space.

The know-how classification unit 222 stores the labeled sentences together with the task ID, sentence-by-sentence, in the know-how storing unit.

Know-how Search Unit

Figure 8:
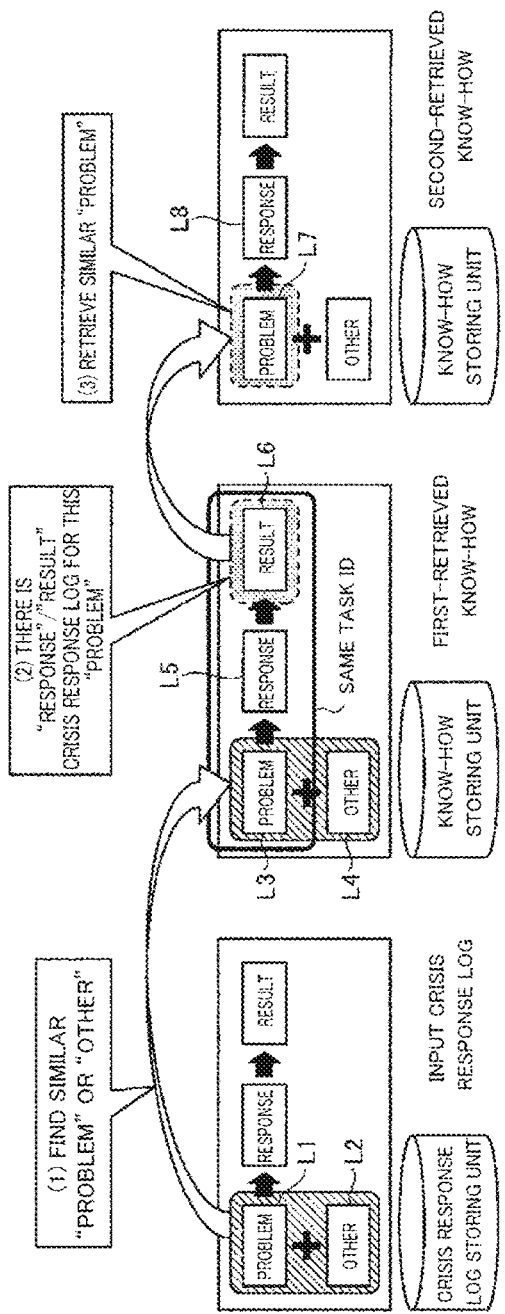
FIG. 8 is a diagram illustrating search processing performed by a know-how search unit shown in FIG. 1.

Next, processing performed by the know-how search unit 223 will be described. FIG. 8 is a diagram illustrating search processing performed by the know-how search unit 223 shown in FIG. 1.

First, there may be cases where no "problem" has become obvious regarding an input crisis response log. Thus, if there is a log that has been classified as "problem" or "other", a know-how search is performed in the following procedure.

First, as a first step of processing, the know-how search unit 223 performs a search if the label of an input crisis response log is the "problem" label or the "other" label. In this case, the know-how search unit 223 generates a search condition using the sentence of a log L1 assigned the "problem" log or a log L2 assigned the "other" label as a search key. Then, the know-how search unit 223 searches the know-how storing unit 212.

As a second step of processing, the know-how search unit 223 searches for logs L3 and L4 that are assigned the "problem" label or the "other" label and have a similarity score greater than or equal to a predetermined threshold, from logs (know-how) stored in the know-how storing unit 212. The similarity score is, for example, the spatial distance between sentences that are to be compared. Also, the similarity score is, for example, the distance between vectors corresponding to the sentences that are to be compared.

As a third step of processing, if the know-how search unit 223 has found a log that is assigned the "problem" label or the "other" label and has a similarly score greater than or equal to the predetermined threshold, from the know-how stored in the know-how storing unit 212 (see (1) in FIG. 8), the know-how search unit 223 checks, using the task ID of the found log as a key, whether or not there is know-how with the same task ID that is assigned the "response" label and the "result" label.

Subsequently, if both know-how L5 and L6 with the same task ID with the "response" label and of the "result" label, respectively, exists in the know-how storing unit 212 (see (2) in FIG. 8), the know-how search unit 223 reads the log L6 that is assigned the "result" label as the "problem" label, and returns to the first step of the search processing. Then, the know-how search unit 223 searches the know-how storing unit 212 for a log that is assigned the "problem" label or the "other" label and has a similarity score greater than or equal to the predetermined threshold relative to the log L6 with the "result" label thereof read as the "problem" label (see (3) in FIG. 8). As a result, the know-how search unit 223 retrieves sentences of logs L7 and L8 that are assigned the "problem" label or the "other" label.

If one or none of the logs (know-how) with the "response" label and the "result" label with the same task ID are in the know-how storing unit 212, the know-how search unit 223 ends the search processing and outputs the search results to the know-how presentation unit 224. Alternatively, if the number of searches exceeds a predetermined upper limit, the know-how search unit 223 outputs the search results to the know-how presentation unit 224.

Know-how Presentation Unit

Figure 9:
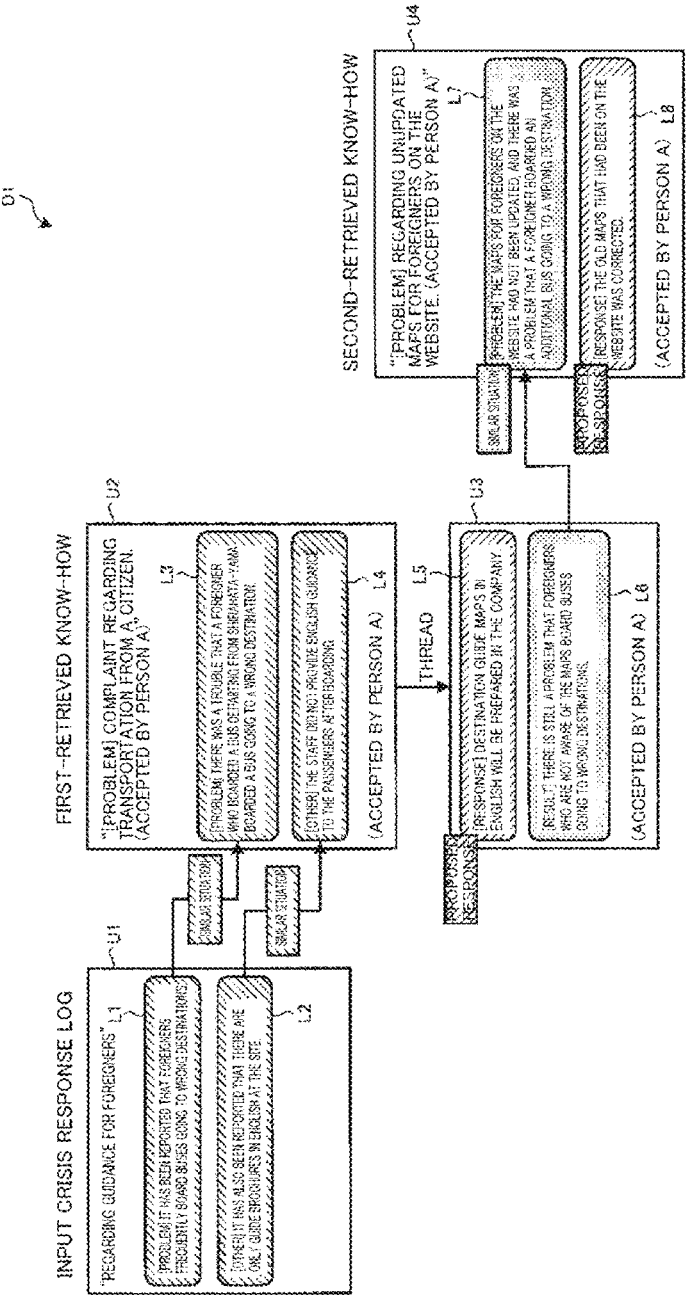
FIG. 9 is a diagram showing an example of the screen of the client terminal.

Next, processing performed by the know-how presentation unit 224 will be described. FIG. 9 is a diagram showing an example of a screen of the client terminal 10. The know-how presentation unit 224 presents similar portions between the input log and the logs retrieved by the know-how search unit 223 in association with each other, to the client terminal 10 from which the input log was input.

Specifically, as shown in a screen D1 in FIG. 9, the know-how presentation unit 224 displays input crisis response logs with labels assigned thereto, in a frame U1 on the left side. For example, the know-how presentation unit 224 displays, in the frame U1, a log L1 with the "problem" label: "It has been reported that foreigners frequently board buses going to wrong destinations.", and a log L2 with the "other" label: "It has also been reported that there are only guide brochures in English at the site." By checking the "problem" label and the "other" label assigned to the crisis response logs, the user can recognize that the content of the input crisis response logs may be a risk to himself or his organization.

The know-how presentation unit 224 then displays, at the center of the screen D1, the know-how that is retrieved in the first search using the logs L1 and L2 that are the input crisis response logs as search keys, while associating the retrieved know-how using arrows the input crisis response logs such that the relationship therebetween can be understood. Furthermore, the know-how presentation unit 24 performs color coding, e.g. shows similar portions with the same background color.

For example, the know-how presentation unit 224 displays the logs L3 and L4, which are retrieved as logs similar to the logs L1 and L2, in a frame U2 in an upper center part of the screen D1. At this time, the logs L1 and L2 and the logs L3 and L4 are associated with each other, respectively, using arrows to indicate similar situations, and the same background color is used. Note that the log L3 is a log indicating that "There was a trouble that a foreigner who boarded a bus boarded a bus going to a wrong destination." with the "problem" label. The log L4 is a log indicating that "The staff did not provide English guidance to the passengers after boarding." with the "other" label. Presentation of these logs L3 and L4 allows the user to specify problem instances similar to the logs that may be risk, and other situations.

The know-how presentation unit 224 displays, in a frame U3, the logs L5 and L6 that are assigned the "response" label or the "result" label, respectively, in the same thread (the same task ID) as the logs L3 and L4 that have been retrieved in the first search. The log L5 is a log indicating that "Destination guide maps in English will be prepared in the company." with the "response" label. The log L6 is a log indicating that "There is still a problem that foreigners who are not aware of the maps board buses going to wrong destinations." with the "result" label.

These logs L5 and L6 indicate the state of response to the logs L3 and L4 that are similar to the input logs L1 and L2, and the results of the response, respectively. Therefore, by checking the logs L5 and L6, the user can quickly understand how to respond to the crisis response logs input by himself, in comparison with the current situation.

Furthermore, the know-how presentation unit 224 shows, on the right side of the screen D1, the results of the second search, which has been performed while reading the "result" label of the log L6 obtained in the first search as the "problem" label and using the sentence of this log L6 as a search key.

Specifically, the know-how presentation unit 224 shows, in a frame U4, the log L7 that is similar to the log L6 in the frame U3: "There is still a problem that foreigners who are not aware of the maps board buses going to wrong destinations.", whose label is read as the "problem" label. The log L7 is a log with the "problem" label, indicating that "The maps for foreigners on the website had not been updated, and there was a problem that a foreigner boarded an additional bus going to a wrong destination." The user can recognize a possible causal relationship with respect to the current situation, by checking the log L7.

Then, the know-how presentation unit 224 shows the log L8 that is assigned the "response" label in the same thread as the log L7 in frame U3. The log L8 is a log indicating that "The old maps that had been on the website was corrected." By checking the log L8, the user can quickly understand how to respond to a risk that may be derived from the crisis response logs input by himself.

At this time, the know-how presentation unit 224 shows the log L5 and the log L8 with the same background color that is different from the background colors for the logs L1 to L4, such that it can be understood that the log L5 and the log L8 indicate proposed responses. Then, the know-how presentation unit 224 presents the log L6 and the log L7 with the same background color that is different from the background colors for the logs L1 to L5 and L8, such that it can be understood that the log L6 and the log L7 indicate problem instances that may be derived from the crisis response logs input by the user.

Thus, the know-how presentation unit 224 displays similar portions in association with each other on the screen of the client terminal 10 such that the correspondence relationship between the input logs and the logs retrieved by the know-how search portion 223 is clear. By checking the screen of the user's client terminal 10, the user can specify a risk corresponding to the situation of the crisis response logs input by himself, and can check the responding action against this risk as know-how.

Also, the user can easily recognize which portions of the retrieved know-how and the content of the crisis response status log input by himself are similar to each other, by checking the screen of his own client terminal 10, and thus, the situation can be better recognized.

Note that, if a crisis response log is classified as the "response" label or the "result" label, the know-how presentation unit 224 presents this classification on the screen of the client terminal 10. If no log with the "problem" label or the "other" label that is similar to the crisis response log is found, and if no log with the "response" label or the "result" label in the same thread as a log with the "problem" label or the "other" label that is similar to the crisis response log is found, the know-how presentation unit 224 presents this search result on the screen of the client terminal 10.

Know-how Registration Processing

Figure 10:
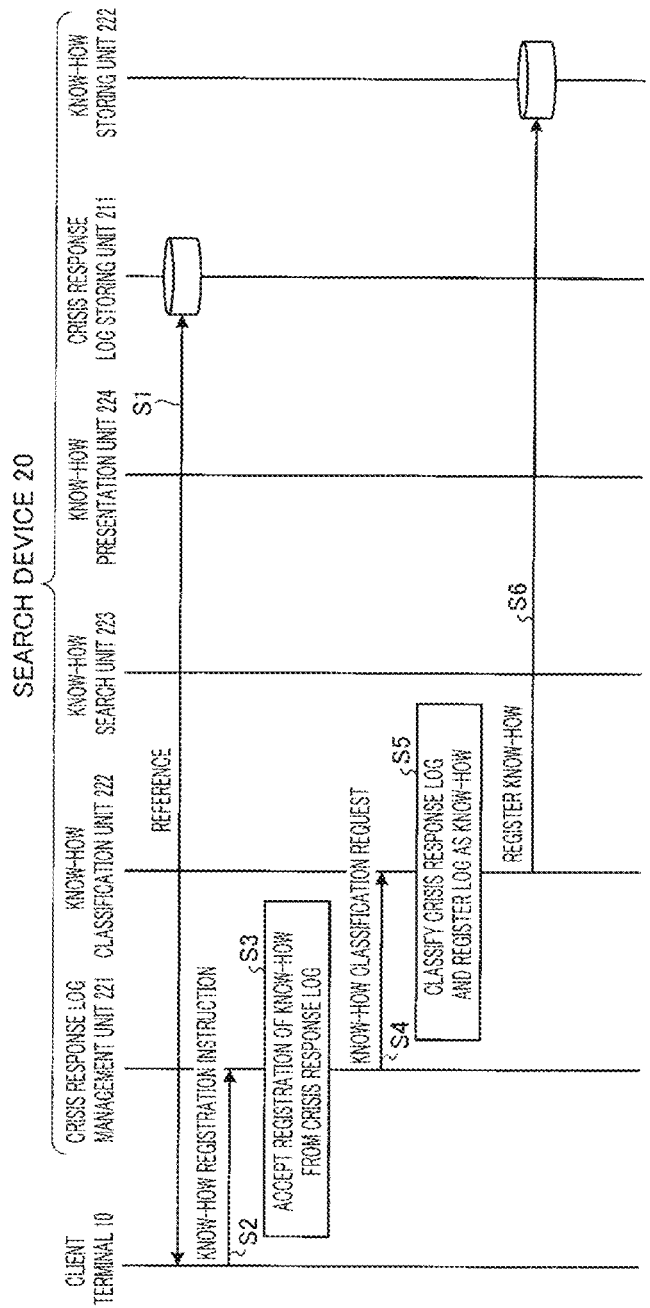
FIG. 10 is a sequence chart showing a processing procedure of know-how registration processing performed by a search device shown in FIG. 1.

Next, a processing procedure of know-how registration processing performed by the search device 20 will be described. FIG. 10 is a sequence chart showing a processing procedure of know-how registration processing performed by the search device 20 shown in FIG. 1.

First, when the user references logs in the crisis response log storing unit 211 on the client terminal 10 (e.g., when referencing the screen in FIG. 6) (step S1), the user operates the client terminal 10 to give an instruction to register know-how based on a crisis response log (step S2).

The crisis response log management unit 221 accepts registration of know-how from the crisis response log (step S3), and requests the know-how classification unit 222 to classify this log to store the log as know-how (step S4). The know-how classification unit 222 classifies the requested crisis response log using the aforementioned feature space, performs labeling, and registers the log as know-how in the know-how storing unit 212 (steps S5 and S6).

Know-how Presentation Unit

Figure 11:
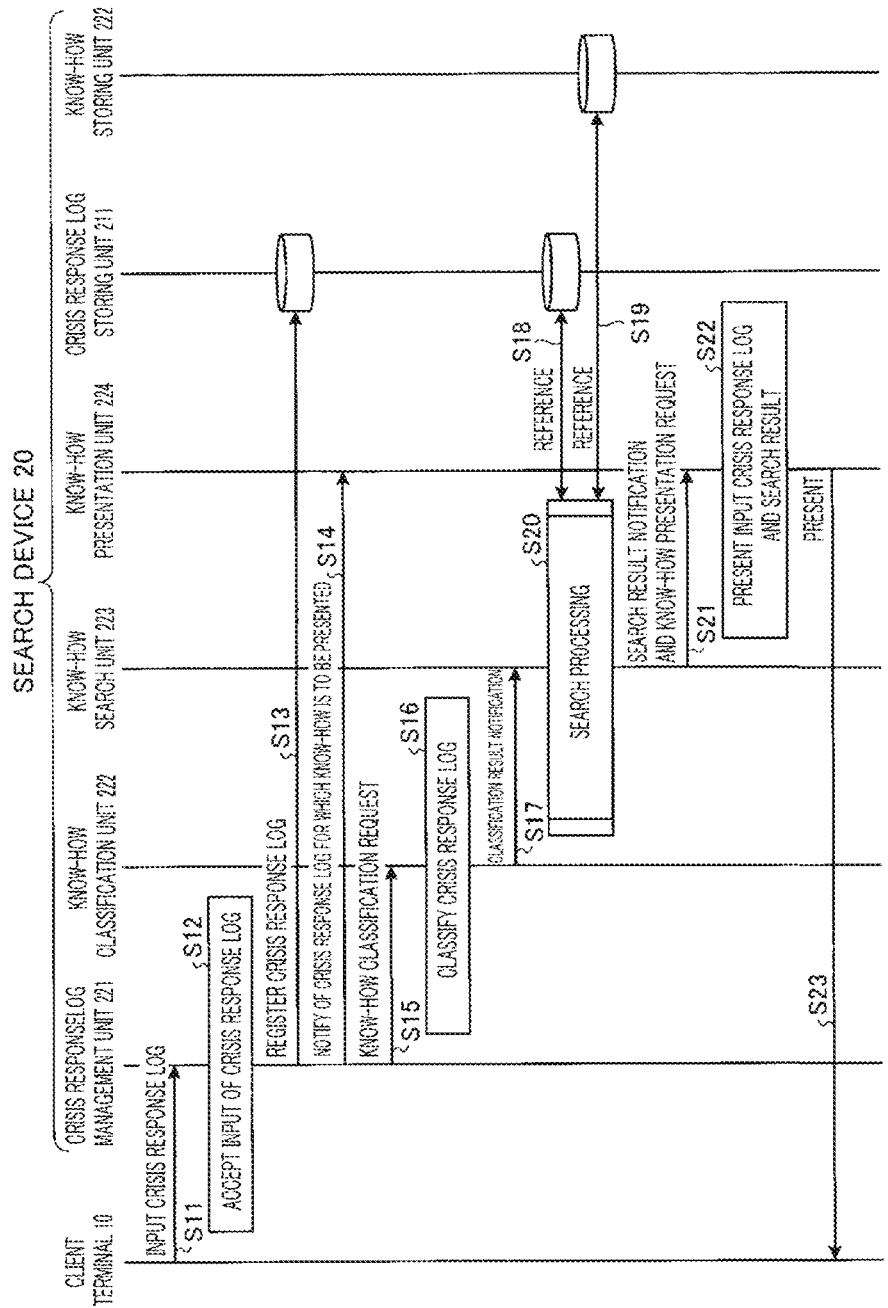
FIG. 11 is a sequence chart showing a processing procedure of know-how presentation processing performed by the search device shown in FIG. 1.

Next, know-how presentation processing performed by the search device 20 will be described. FIG. 11 is a sequence chart showing a processing procedure of know-how presentation processing performed by the search device 20 shown in FIG. 1.

First, in the search processing, upon a crisis response log being input via the client terminal 10 (step S11), the crisis response log management unit 221 accepts the input of the crisis response log (step S12), and registers the accepted crisis response log in the crisis response log storing unit 211

(step S13). Next, the crisis response log management unit 221 notifies the know-how presentation unit 224 of the crisis response log for which know-how is to be presented (step S14). Then, the crisis response log management unit 221 requests the know-how classification unit 222 to classify this log (step S15).

The know-how classification unit 222 classifies the crisis response log for which the request has been made, using the aforementioned feature space, performs labeling (step S16), and notifies the know-how search unit 223 of the classification result (step S17).

The know-how search unit 223 references the crisis response log storing unit 211 and the know-how storing unit 212 (steps S18 and S19), and performs search processing to retrieve a log similar to the crisis response log for which the notification has been given (step S20). The know-how search unit 223 notifies the know-how search unit 224 of the search result, and requests the know-how presentation unit 224 to present the know-how (step S21).

The know-how presentation unit 224 presents, to the client terminal 10 from which the input log was input, similar portions between the input log and the logs retrieved by the know-how search unit 223 in association with each other (steps S22 and S23), and processing ends.

Search Processing

Figure 12:
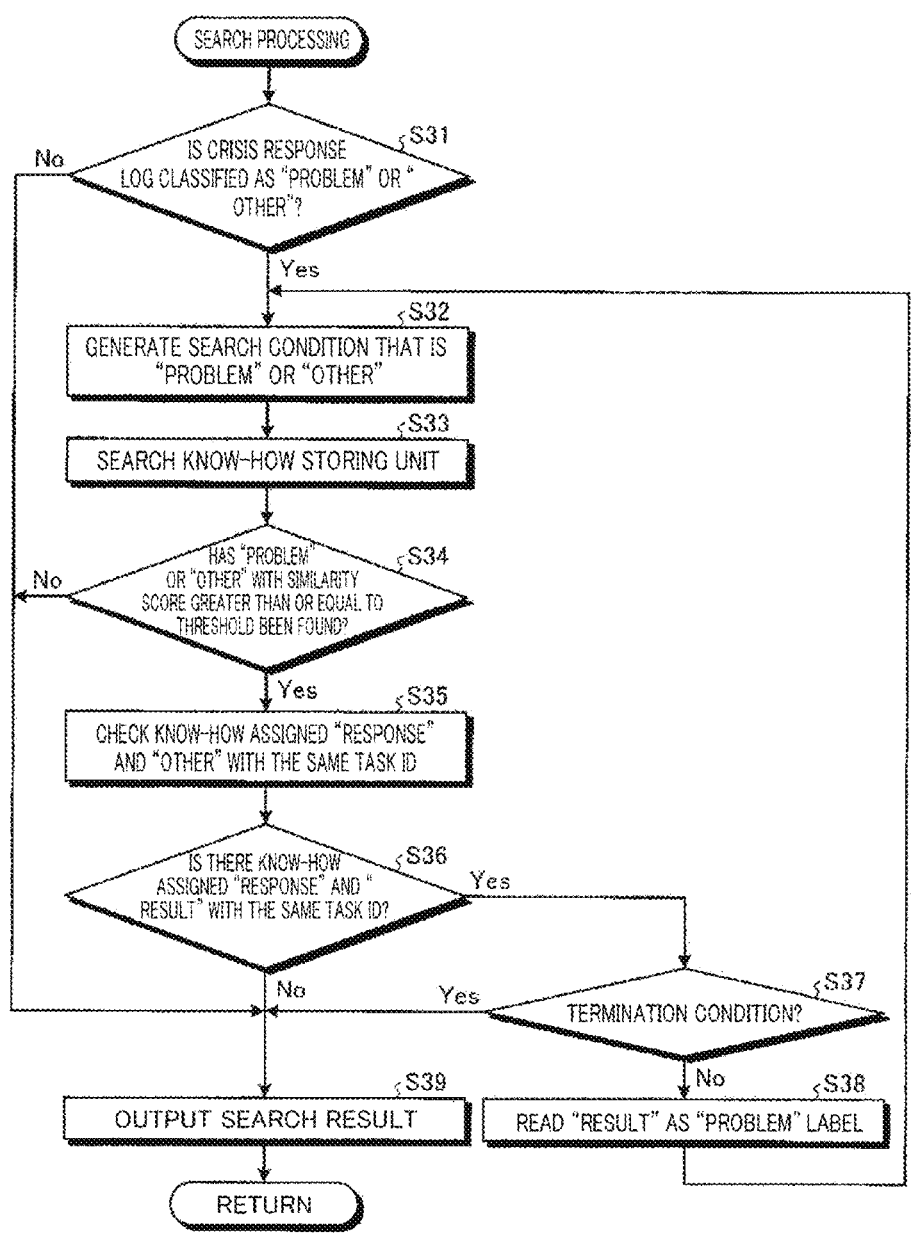
FIG. 12 is a flowchart showing a processing procedure of search processing shown in FIG. 11.

Next, a processing procedure of the search processing (step S20) will be described. FIG. 12 is a flowchart showing a processing procedure of the search processing shown in FIG. 11.

As shown in FIG. 12, the know-how search unit 223 determines whether the input crisis response log has been classified as a problem instance ("problem" label) or the other instance ("other" label) (step S31).

If the know-how search unit 223 determines that the input crisis response log has been classified as a problem instance ("problem" label) or the other instance ("other" label) (step S31: Yes), the know-how search unit 223 generates a search condition using the sentence of the log with this "problem" label or "other" label as a search key (step S32), and searches the know-how storing unit 212 (step S33).

The know-how search unit 223 determines whether or not a log that is assigned the "problem" label or the "other" label and has a similarity score greater than or equal to a predetermined threshold has been found from the logs (know-how) stored in the know-how storing unit 212 (step S34). If the know-how search unit 223 determines that a log that is assigned the "problem" label or the "other" label and has a similarly score greater than or equal to the predetermined threshold has been found (step S34: Yes), the know-how search unit 223 checks whether or not there is know-how that is assigned the "response" label or the "result" label with the same task ID (step S35).

If the know-how search unit 223 determines that there is know-how that is assigned the "response" label and the "result" label with the same task ID (step S36: Yes), the know-how search unit 223 determines whether or not the termination condition has been met (step S37).

If the know-how search unit 223 determines that the termination condition has not been met (step S37: No), the log L6 assigned the "result" label is read as the "problem" label (step S38), and returns to step S32. Then, in step S32, the know-how search unit 223 searches the know-how storing unit 212 for a log that is assigned the "problem" label or the "other" label and has a similarity score greater than or equal to a predetermined threshold with respect to the know-how with the "result" label thereof read as the "problem" label.

On the other hand, if the know-how search unit 223 determines that the input crisis response log is not classified as a problem instance ("problem" label) or the other instance ("other" label) (step S31: No), or if the know-how search unit 223 determines that no log that is assigned the "problem" label or the "other" label and has a similarity score greater than or equal to the predetermined threshold has been found (step S34: No), or if the know-how search unit 223 determines that there is no know-how assigned the "response" label or the "result" label with the same task ID (step S36: No), or if the know-how search unit 223 determines that the termination condition has been met (step S37: Yes), the know-how search unit 223 outputs the search result (step S39), and the search processing ends.

Effect of Embodiment

Thus, the search unit 20 according to the embodiment stores each of the logs indicating past crisis response instances in association with the "problem" label, the "result" label, the "response" label, or the "other" label, and a task number. Also, the search device 20 repeats a search to retrieve a log similar to a first search key that is an input log from the stored logs, and a search to retrieve a log similar to a second search key that is a log assigned the response label or the result label with the same task number as the retrieved log assigned the problem label, until a predetermined condition is met.

As a result, the search device 20 can retrieve, as logs that are similar to the input log, logs indicating a possible causal relationship with respect to the current situation, and the response that has actually been performed to a problem similar to the problem indicated by the log, and the results thereof. Therefore, by checking these search results, the user can specify the risk corresponding to the situation of the crisis response log input by himself, even when responding to a crisis event such as a large-scale natural disaster or a cyber-attack, and can check know-how regarding the risk.

The search device 20 can properly classify logs using the feature space that is constructed, in advance, by supervised classification through natural language processing, and can perform smooth search processing.

In addition, the search device 20 performs the search if the input log is assigned the "response" label or the "other" label. Thus, the user can check the appropriate know-how at the timing when a response needs to be actually made to the current situation.

The search device 20 presents similar portions between the input log and the retrieved logs in association with each other, to the client terminal from which the input log was input. Thus, the user can readily recognize which portions of the retrieved know-how and the content of the crisis response situation log input by himself are similar to each other, by checking the screen of the client terminal 10. As a result, the situation can be better recognized.

Thus, according to the present embodiment, to respond to a crisis, similar instances can be appropriately retrieved from past crisis response instances, regardless of a user's experience. In the present embodiment, a risk is specified in accordance with the current situation, and meanwhile, the response to a similar risk and the results thereof are presented in association with each other. Thus, an unexperienced user can recognize the risk of his own or his organization and be aware of the need for taking measures, and promptly understand how to deal with the risk in comparison with the current situation.

System Configuration Etc.

The constituent elements of the devices shown in the figures are functional and conceptual elements, and need not necessarily be physically configured as shown in the figures. That is to say, specific modes of distribution and integration of the devices are not limited to those shown in the figures, and all or some of the devices can be functionally or physically distributed or integrated in any unit, in accordance with various loads, usage situations, or the like. Furthermore, all or some of the processing functions performed by the devices may be realized by a CPU (Central Processing Unit) and a program that is analyzed and executed by the CPU, or may be realized as hardware using wired logic.

Of the processing described in the embodiment of the present invention, the entire or part of the processing that is described as being automatically performed may be manually performed, or the entire or part of the processing that is described as being manually performed may be automatically performed using a known method. In addition, the processing procedure, control procedure, specific names, and information including various data and parameters described in the above description and the figures may be changed in any manner, unless otherwise stated.

Program

Figure 13:
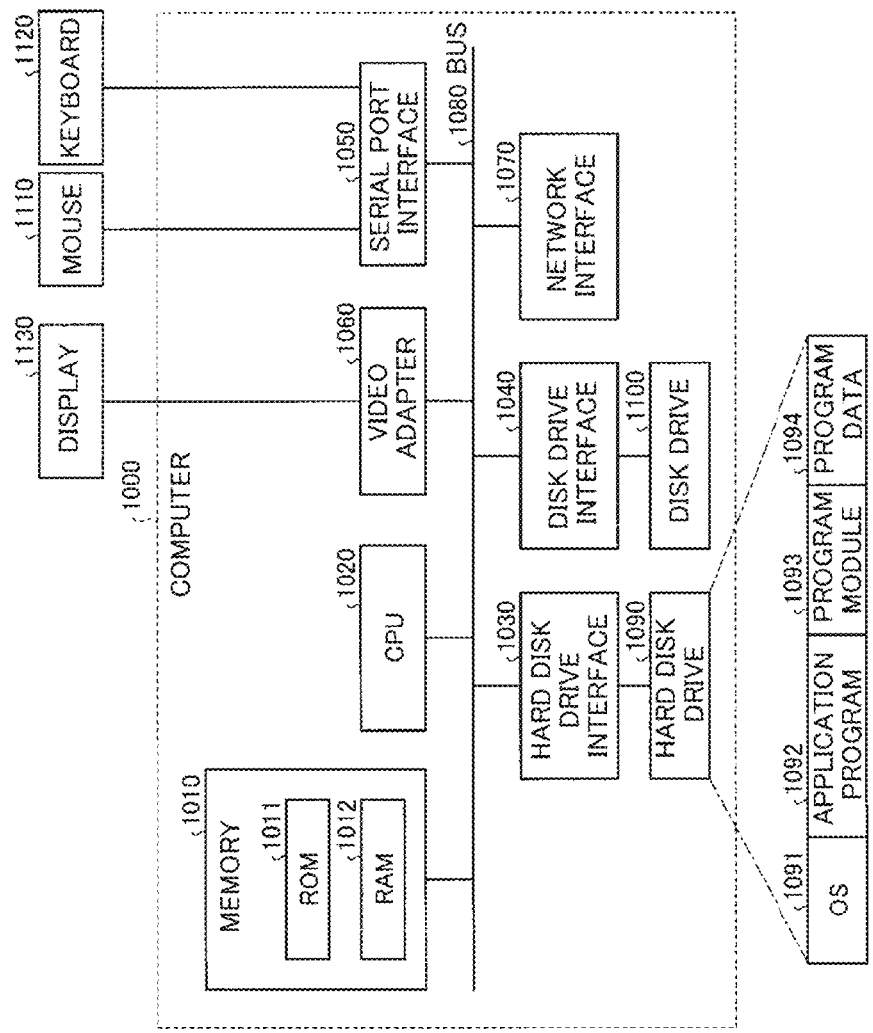
FIG. 13 is a diagram showing an example of a computer that realizes the search device as a result of a program being executed.

FIG. 13 is a diagram showing an example of a computer by which the search device 20 is realized as a result of a program being executed. A computer 1000 has a memory 1010 and a CPU 1020, for example. Also, the computer 1000 has a hard disk drive interface 1030, a disk drive interface 1040, a serial port interface 1050, a video adapter 1060, and a network interface 1070. These parts are connected by a bus 1080.

The memory 1010 includes a ROM (Read Only Memory) 1011 and a RAM 1012. The ROM 1011 stores a boot program such as a BIOS (Basic Input Output System), for example. The hard disk drive interface 1030 is connected to a hard disk drive 1090. The disk drive interface 1040 is connected to a disk drive 1100. A removable storage medium, such as a magnetic disk or an optical disk, is inserted into the disk drive 1100, for example. The serial port interface 1050 is connected to a mouse 1110 and a keyboard 1120, for example. The video adapter 1060 is connected to a display 1130, for example.

The hard disk drive 1090 stores an OS 1091, an application program 1092, a program module 1093, and program data 1094, for example. That is to say, a program that defines processing to be performed by the search device 20 is implemented as a program module 1093 in which codes that can be executed by the computer 1000 are described. The program module 1093 is stored in the hard disk drive 1090, for example. For example, a program module 1093 for performing processing similar to that of the functional configuration of the search device 20 is stored in the hard disk drive 1090. Note that the hard disk drive 1090 may be replaced by an SSD (Solid State Drive).

Setting data used in the processing in the above-described embodiment is stored as the program data 1094 in the memory 1010 or the hard disk drive 1090, for example. The CPU 1020 loads, to the RAM 1012, the program module 1093 and the program data 1094 that are stored in the memory 1010 and the hard disk drive 1090, and performs them as needed.

Note that the program module 1093 and the program data 1094 are not limited to being stored in the hard disk drive 1090, and may be stored in a removable storage medium and loaded via the disk drive 1100 or the like by the CPU 1020, for example. Alternatively, the program module 1093 and the program data 1094 may be stored in other computers that are connected via a network (LAN, WAN, etc.). The program module 1093 and the program data 1094 may be loaded from the other computers via the network interface 1070 by the CPU 1020.

Although a description has been given of an embodiment to which the present invention made by the present inventor is applied thus far, the present invention is not limited by the description and the figures that are given through the present embodiment and constitute a part of disclosure of the present invention. That is to say, all other embodiments, examples, management technologies and the like that are made based on the present embodiment by those skilled in the art are encompassed in the scope of the present invention.

REFERENCE SIGNS LIST

10 Client terminal
21 Search device
21 Storing unit
22 Control unit
30 Network
211 Crisis response log storing unit
212 Know-how storing unit
221 Crisis response log management unit
222 Know-how classification unit
223 Know-how search unit
224 Know-how presentation unit

The invention claimed is:

1. A search device, comprising:
 a memory for storing a log indicating a past crisis response instance, a problem label indicating that the log is of a problem instance that is to be responded and solved, a result label indicating that the log is of a result brought about by a responding action, a response label indicating that the log is of a responding action that has been performed to solve a problem, and a task number corresponding to the log, in association with each other; and
 search circuitry for repeating a search to retrieve a log based on a first search key that is an input log from logs assigned the problem label stored in the memory, and a search to retrieve a log based on a second search key that is a log assigned the result label with the same task number as the retrieved log assigned the problem label, until a predetermined termination condition is met.

2. The search device according to claim 1, further comprising:
 classification circuitry for, if instructed to classify the log, classify the log as one of the problem instance, the result, the responding action, and an other instance that is not the problem instance, the result, or the responding action, and assigning a label corresponding to a classification result to the log,
 wherein the search circuitry performs the search if the input log is assigned the problem label or an other label indicating that the log is of the other instance by the classification circuitry.

3. The search device according to claim 1, further comprising:
 a presentation circuitry for presenting similar portions between the input log and a log retrieved by the search circuitry in association with each other, on a client terminal from which the input log has been input.

4. A search method to be performed by a search device that includes a memory for storing a log indicating a past crisis response instance, a problem label indicating that the log is of a problem instance that is to be responded and solved, a result label indicating that the log is of a result brought about by a responding action, and a response label indicating that the log is of a responding action that has been performed to solve a problem, and a task number corresponding to the log, in association with each other, the method comprising:

a step of repeating a search to retrieve a log based on a first search key that is an input log from logs assigned the problem label stored in the memory, and a search to retrieve a log based on a second search key that is a log assigned the result label with the same task number as the retrieved log assigned the problem label, until a predetermined termination condition is met.

5. A non-transitory, computer-readable medium storing a search program for causing a computer to function as the search device according to claim 1.

* * * * *